No. 60,026. PATENTED NOV. 27, 1866.
J. B. MARTINDALE.
HOOK AND EYE.
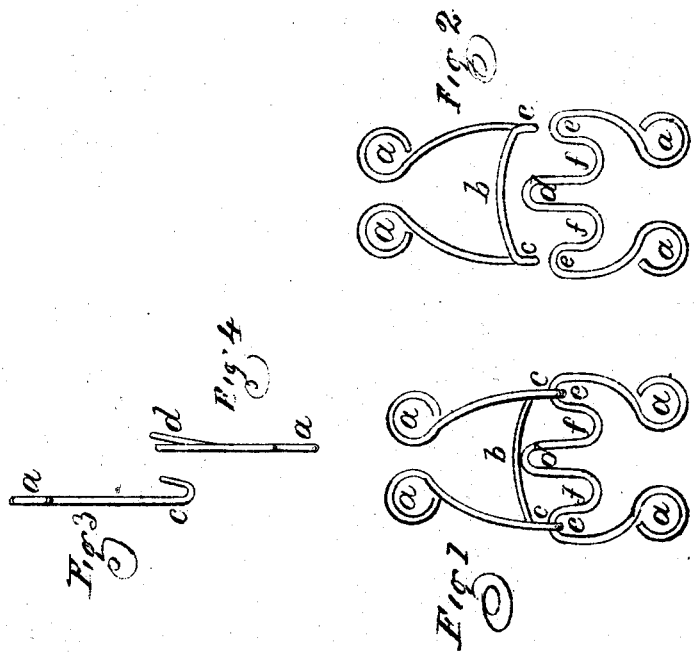
Witnesses
D. A. Foster
Robert B. Carr
Inventor
James B. Martindale

United States Patent Office.

IMPROVEMENT IN HOOKS AND EYES.

JAMES B. MARTINDALE, OF NEW CASTLE, INDIANA.

Letters Patent No. 60,026, dated November 27, 1866.

SPECIFICATION.

TO WHOM IT MAY CONCERN:

Be it known that I, J. B. MARTINDALE, of New Castle, Henry county, Indiana, have invented certain new and useful improvements in Hooks and Eyes for clothing; and I do hereby declare the following to be a full, clear, and exact description of the same, reference being had to the accompanying drawings, and the letters of reference marked thereon. In the drawings—

Figure 1 represents my improved hook and eye connected.

Figure 2 represents a top view of the same detached.

Figure 3 is a side view of the hook; and

Figure 4 is a side view of the eye.

To enable those skilled in the art to construct my improved hook and eye, I will proceed to describe the same.

The hook and eye are both constructed of hardened wire of suitable size, and they are formed as follows: The hook has at each end of the wire of which it is composed loops, $a$ $a$, by which it is attached; when used, the wire is bent to the form shown in figs. 1 and 2, the central portion being turned back, forming an elongated hook, $b$, curved at $c$. The eye has similar loops, $a$ $a$, at the end of the wire of which it is formed, for a like purpose. The wire is bent to the form shown in figs. 1 and 2, presenting three curved projections, $c$, $d$, and $e$; the exterior loops, $e$ $e$, are just wide enough to receive the shank of the hook at $c$. The tongue, $d$, projects a little further beyond the ends of the loops, $e$ $e$, than the length of the hook part, $b$, as turned back from the shank of the hook. The tongue, $d$, is turned slightly up from the plane of the eye, as shown in fig. 4. When the hook is inserted in the eye the bar, $b$, passes over and presses down the tongue, $d$. When the hook is fully inserted in the eye it will not casually become disengaged, because when the hook is pressed back the part $b$ is forced under the tongue, $d$, of the eye. In order to disengage the eye and hook, the tongue, $d$, must be pressed down and the end of the eye at $a$ $a$ be slightly raised or inclined upward by depressing the other end of the eye, when the hook will be readily disengaged, the part $b$ passing over the tongue, $d$.

What I claim as my invention, and desire to secure by Letters Patent, is—

A hook formed as described, and an eye having loops, $e$ $e$, and a tongue $d$, when respectively constructed and arranged to operate, when combined, substantially as and for the purpose set forth.

JAMES B. MARTINDALE.

Witnesses:
ELI B. PHILLIPS,
HENRY HERLIMAN.